United States Patent
Teo et al.

(10) Patent No.: US 11,155,102 B2
(45) Date of Patent: *Oct. 26, 2021

(54) IMAGE TO SCRIPT CONVERTER

(71) Applicant: Datamax-O'Neil Corporation, Altamonte Springs, FL (US)

(72) Inventors: Boon Keat Teo, Singapore (SG); Rudy Ye Ru Koh, Singapore (SG); Shufeng Zheng, Singapore (SG); Anchela Yap, Singapore (SG)

(73) Assignee: DATAMAX-O'NEIL CORPORATION, Altamonte Springs, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/897,913

(22) Filed: Jun. 10, 2020

(65) Prior Publication Data

US 2020/0298590 A1    Sep. 24, 2020

Related U.S. Application Data

(63) Continuation of application No. 15/839,913, filed on Dec. 13, 2017, now Pat. No. 10,703,112.

(51) Int. Cl.
    *G06F 3/12*         (2006.01)
    *B41J 3/407*        (2006.01)
    *B41J 3/01*         (2006.01)

(52) U.S. Cl.
    CPC .............. *B41J 3/4075* (2013.01); *B41J 3/01* (2013.01); *G06F 3/1203* (2013.01);
(Continued)

(58) Field of Classification Search
None
See application file for complete search history.

(56) References Cited

U.S. PATENT DOCUMENTS 5,602,377 A † 2/1997 Beller
6,832,725 B2 † 12/2004 Gardiner
(Continued)

FOREIGN PATENT DOCUMENTS

WO      2004/068368 A1    8/2004
WO   WO-2004/068368 A1 † 8/2004
(Continued)

OTHER PUBLICATIONS

Advisory Action (PTOL-303) dated Jan. 31, 2019 for U.S. Appl. No. 15/839,913.
(Continued)

*Primary Examiner* — Dung D Tran
(74) *Attorney, Agent, or Firm* — Alston & Bird LLP (57) ABSTRACT

Methods for converting an image to source script are provided. Generally applied to thermal printers, the methods may assist users in reproducing or amending a label without actual source script. In one embodiment, a mobile device comprising a software application may be able to scan an image, for example a barcode label. The software application may use an image processing library to recognize smart object fields in the captured image, including text, barcodes, image and shapes and then may translate the smart object information to a printing language script automatically. The application may provide the capability to a user to adjust the parameters specific to each of the identified smart objects. Once the user makes the necessary changes, a script file may be generated based on the updated smart object information. Then, the label may be sent to a printer from the application itself.

20 Claims, 2 Drawing Sheets

(52) U.S. Cl.
CPC .......... *G06F 3/1205* (2013.01); *G06F 3/1253* (2013.01); *G06F 3/1268* (2013.01); *G06F 3/1285* (2013.01)

(56) References Cited

U.S. PATENT DOCUMENTS

| | | | |
|---|---|---|---|
| 7,128,266 B2 † | 10/2006 | Zhu | |
| 7,159,783 B2 † | 1/2007 | Walczyk | |
| 7,413,127 B2 † | 8/2008 | Ehrhart | |
| 7,664,321 B2 ‡ | 2/2010 | Fukuoka | H04N 1/00363 382/18 |
| 7,726,575 B2 † | 6/2010 | Wang | |
| 8,294,969 B2 † | 10/2012 | Plesko | |
| 8,317,105 B2 † | 11/2012 | Kotlarsky | |
| 8,322,622 B2 † | 12/2012 | Liu | |
| 8,366,005 B2 † | 2/2013 | Kotlarsky et al. | |
| 8,371,507 B2 † | 2/2013 | Haggerty et al. | |
| 8,376,233 B2 † | 2/2013 | Horn | |
| 8,381,979 B2 † | 2/2013 | Franz | |
| 8,390,909 B2 † | 3/2013 | Plesko | |
| 8,408,464 B2 † | 4/2013 | Zhu | |
| 8,408,468 B2 † | 4/2013 | Van Horn | |
| 8,408,469 B2 † | 4/2013 | Good | |
| 8,424,768 B2 † | 4/2013 | Rueblinger | |
| 8,448,863 B2 † | 5/2013 | Xian | |
| 8,457,013 B2 † | 6/2013 | Essinger | |
| 8,459,557 B2 † | 6/2013 | Havens et al. | |
| 8,469,272 B2 † | 6/2013 | Kearney | |
| 8,474,712 B2 † | 7/2013 | Kearney | |
| 8,479,992 B2 † | 7/2013 | Kotlarsky | |
| 8,490,877 B2 † | 7/2013 | Kearney | |
| 8,517,271 B2 † | 8/2013 | Kotlarsky | |
| 8,523,076 B2 † | 9/2013 | Good | |
| 8,528,818 B2 † | 9/2013 | Ehrhart | |
| 8,544,737 B2 † | 10/2013 | Gomez | |
| 8,548,420 B2 † | 10/2013 | Grunow et al. | |
| 8,550,335 B2 † | 10/2013 | Samek et al. | |
| 8,550,354 B2 † | 10/2013 | Gannon et al. | |
| 8,550,357 B2 † | 10/2013 | Kearney | |
| 8,556,174 B2 † | 10/2013 | Kosecki et al. | |
| 8,556,176 B2 † | 10/2013 | Van et al. | |
| 8,556,177 B2 † | 10/2013 | Hussey et al. | |
| 8,559,767 B2 † | 10/2013 | Barber et al. | |
| 8,561,895 B2 † | 10/2013 | Gomez et al. | |
| 8,561,903 B2 † | 10/2013 | Sauerwein, Jr. | |
| 8,561,905 B2 † | 10/2013 | Edmonds et al. | |
| 8,565,107 B2 † | 10/2013 | Pease et al. | |
| 8,571,307 B2 † | 10/2013 | Li et al. | |
| 8,579,200 B2 † | 11/2013 | Samek | |
| 8,583,924 B2 † | 11/2013 | Caballero | |
| 8,584,945 B2 † | 11/2013 | Wang | |
| 8,587,595 B2 † | 11/2013 | Wang | |
| 8,587,697 B2 † | 11/2013 | Hussey | |
| 8,588,869 B2 † | 11/2013 | Sauerwein, Jr. | |
| 8,590,789 B2 † | 11/2013 | Nahill | |
| 8,596,539 B2 † | 12/2013 | Havens | |
| 8,596,542 B2 † | 12/2013 | Havens | |
| 8,596,543 B2 † | 12/2013 | Havens | |
| 8,599,271 B2 † | 12/2013 | Havens | |
| 8,599,957 B2 † | 12/2013 | Peake | |
| 8,600,158 B2 † | 12/2013 | Li | |
| 8,600,167 B2 † | 12/2013 | Showering | |
| 8,602,309 B2 † | 12/2013 | Longacre, Jr. | |
| 8,608,053 B2 † | 12/2013 | Meier | |
| 8,608,071 B2 † | 12/2013 | Liu | |
| 8,611,309 B2 † | 12/2013 | Wang | |
| 8,615,487 B2 † | 12/2013 | Gomez | |
| 8,621,123 B2 † | 12/2013 | Caballero | |
| 8,622,303 B2 † | 1/2014 | Meier | |
| 8,628,013 B2 † | 1/2014 | Ding | |
| 8,628,015 B2 † | 1/2014 | Wang | |
| 8,628,016 B2 † | 1/2014 | Winegar | |
| 8,629,926 B2 † | 1/2014 | Wang | |
| 8,630,491 B2 † | 1/2014 | Longacre, Jr. | |
| 8,635,309 B2 † | 1/2014 | Berthiaume | |
| 8,636,200 B2 † | 1/2014 | Kearney | |
| 8,636,212 B2 † | 1/2014 | Nahill | |
| 8,636,215 B2 † | 1/2014 | Ding | |
| 8,636,224 B2 † | 1/2014 | Wang | |
| 8,638,806 B2 † | 1/2014 | Wang | |
| 8,640,958 B2 † | 2/2014 | Lu | |
| 8,640,960 B2 † | 2/2014 | Wang | |
| 8,643,717 B2 † | 2/2014 | Li | |
| 8,646,692 B2 † | 2/2014 | Meier | |
| 8,646,694 B2 † | 2/2014 | Wang | |
| 8,657,200 B2 † | 2/2014 | Ren | |
| 8,659,397 B2 † | 2/2014 | Vargo | |
| 8,668,149 B2 † | 3/2014 | Good | |
| 8,678,285 B2 † | 3/2014 | Kearney | |
| 8,678,286 B2 † | 3/2014 | Smith | |
| 8,682,077 B1 † | 3/2014 | Longacre, Jr. | |
| D702,237 S † | 4/2014 | Oberpriller | |
| 8,687,282 B2 † | 4/2014 | Feng | |
| 8,692,927 B2 † | 4/2014 | Pease | |
| 8,695,880 B2 † | 4/2014 | Bremer | |
| 8,698,949 B2 † | 4/2014 | Grunow | |
| 8,702,000 B2 † | 4/2014 | Barber | |
| 8,717,494 B2 † | 5/2014 | Gannon | |
| 8,720,783 B2 † | 5/2014 | Biss | |
| 8,723,804 B2 † | 5/2014 | Fletcher | |
| 8,723,904 B2 † | 5/2014 | Marty | |
| 8,727,223 B2 † | 5/2014 | Wang | |
| 8,740,082 B2 † | 6/2014 | Wilz, Sr. | |
| 8,740,085 B2 † | 6/2014 | Furlong | |
| 8,746,563 B2 † | 6/2014 | Hennick | |
| 8,750,445 B2 † | 6/2014 | Peake | |
| 8,752,766 B2 † | 6/2014 | Xian | |
| 8,756,059 B2 † | 6/2014 | Braho | |
| 8,757,495 B2 † | 6/2014 | Qu | |
| 8,760,563 B2 † | 6/2014 | Koziol | |
| 8,763,909 B2 † | 7/2014 | Reed | |
| 8,777,108 B2 † | 7/2014 | Coyle | |
| 8,777,109 B2 † | 7/2014 | Oberpriller | |
| 8,779,898 B2 † | 7/2014 | Havens | |
| 8,781,520 B2 † | 7/2014 | Payne | |
| 8,783,573 B2 † | 7/2014 | Havens | |
| 8,789,757 B2 † | 7/2014 | Barten | |
| 8,789,758 B2 † | 7/2014 | Hawley | |
| 8,789,759 B2 † | 7/2014 | Xian | |
| 8,794,520 B2 † | 8/2014 | Wang | |
| 8,794,522 B2 † | 8/2014 | Ehrhart | |
| 8,794,525 B2 † | 8/2014 | Amundsen | |
| 8,794,526 B2 † | 8/2014 | Wang | |
| 8,798,367 B2 † | 8/2014 | Ellis | |
| 8,807,431 B2 † | 8/2014 | Wang | |
| 8,807,432 B2 † | 8/2014 | Van Horn | |
| 8,811,711 B2 † | 8/2014 | Calman | |
| 8,820,630 B2 † | 9/2014 | Qu | |
| 8,822,848 B2 † | 9/2014 | Meagher | |
| 8,824,692 B2 † | 9/2014 | Sheerin | |
| 8,824,696 B2 † | 9/2014 | Braho | |
| 8,842,849 B2 † | 9/2014 | Wahl | |
| 8,844,822 B2 † | 9/2014 | Kotlarsky | |
| 8,844,823 B2 † | 9/2014 | Fritz | |
| 8,849,019 B2 † | 9/2014 | Li | |
| D716,285 S † | 10/2014 | Chaney | |
| 8,851,383 B2 † | 10/2014 | Yeakley | |
| 8,854,633 B2 † | 10/2014 | Laffargue | |
| 8,866,963 B2 † | 10/2014 | Grunow | |
| 8,868,421 B2 † | 10/2014 | Braho | |
| 8,868,519 B2 † | 10/2014 | Maloy | |
| 8,868,802 B2 † | 10/2014 | Barten | |
| 8,868,803 B2 † | 10/2014 | Caballero | |
| 8,870,074 B1 † | 10/2014 | Gannon | |
| 8,879,639 B2 † | 11/2014 | Sauerwein, Jr. | |
| 8,880,426 B2 † | 11/2014 | Smith | |
| 8,881,983 B2 † | 11/2014 | Havens | |
| 8,881,987 B2 † | 11/2014 | Wang | |
| 8,903,172 B2 † | 12/2014 | Smith | |
| 8,908,995 B2 † | 12/2014 | Benos | |
| 8,910,870 B2 † | 12/2014 | Li | |
| 8,910,875 B2 † | 12/2014 | Ren | |
| 8,914,290 B2 † | 12/2014 | Hendrickson | |
| 8,914,788 B2 † | 12/2014 | Pettinelli | |

(56) References Cited

U.S. PATENT DOCUMENTS

| | | |
|---|---|---|
| 8,915,439 B2 † | 12/2014 | Feng |
| 8,915,444 B2 † | 12/2014 | Havens |
| 8,916,789 B2 † | 12/2014 | Woodburn |
| 8,918,250 B2 † | 12/2014 | Hollifield |
| 8,918,564 B2 † | 12/2014 | Caballero |
| 8,925,818 B2 † | 1/2015 | Kosecki |
| 8,939,374 B2 † | 1/2015 | Jovanovski |
| 8,942,480 B2 † | 1/2015 | Ellis |
| 8,944,313 B2 † | 2/2015 | Williams |
| 8,944,327 B2 † | 2/2015 | Meier |
| 8,944,332 B2 † | 2/2015 | Harding |
| 8,950,678 B2 † | 2/2015 | Germaine |
| D723,560 S † | 3/2015 | Zhou |
| 8,967,468 B2 † | 3/2015 | Gomez |
| 8,971,346 B2 † | 3/2015 | Sevier |
| 8,976,030 B2 † | 3/2015 | Cunningham |
| 8,976,368 B2 † | 3/2015 | El Akel |
| 8,978,981 B2 † | 3/2015 | Guan |
| 8,978,983 B2 † | 3/2015 | Bremer |
| 8,978,984 B2 † | 3/2015 | Hennick |
| 8,985,456 B2 † | 3/2015 | Zhu |
| 8,985,457 B2 † | 3/2015 | Soule, III |
| 8,985,459 B2 † | 3/2015 | Kearney |
| 8,985,461 B2 † | 3/2015 | Gelay |
| 8,988,578 B2 † | 3/2015 | Showering |
| 8,988,590 B2 † | 3/2015 | Gillet |
| 8,991,704 B2 † | 3/2015 | Hopper |
| 8,996,194 B2 † | 3/2015 | Davis |
| 8,996,384 B2 † | 3/2015 | Funyak |
| 8,998,091 B2 † | 4/2015 | Edmonds |
| 9,002,641 B2 † | 4/2015 | Showering |
| 9,007,368 B2 † | 4/2015 | Laffargue |
| 9,010,641 B2 † | 4/2015 | Qu |
| 9,015,513 B2 † | 4/2015 | Murawski |
| 9,016,576 B2 † | 4/2015 | Brady |
| D730,357 S † | 5/2015 | Fitch |
| 9,022,288 B2 † | 5/2015 | Nahill |
| 9,030,964 B2 † | 5/2015 | Essinger |
| 9,033,240 B2 † | 5/2015 | Smith |
| 9,033,242 B2 † | 5/2015 | Gillet |
| 9,036,054 B2 † | 5/2015 | Koziol |
| 9,037,344 B2 † | 5/2015 | Chamberlin |
| 9,038,911 B2 † | 5/2015 | Xian |
| 9,038,915 B2 † | 5/2015 | Smith |
| D730,901 S † | 6/2015 | Oberpriller |
| D730,902 S † | 6/2015 | Fitch |
| 9,047,098 B2 † | 6/2015 | Barten |
| 9,047,359 B2 † | 6/2015 | Caballero |
| 9,047,420 B2 † | 6/2015 | Caballero |
| 9,047,525 B2 † | 6/2015 | Barber |
| 9,047,531 B2 † | 6/2015 | Showering |
| 9,049,640 B2 † | 6/2015 | Wang |
| 9,053,055 B2 † | 6/2015 | Caballero |
| 9,053,378 B1 † | 6/2015 | Hou |
| 9,053,380 B2 † | 6/2015 | Xian |
| 9,057,641 B2 † | 6/2015 | Amundsen |
| 9,058,526 B2 † | 6/2015 | Powilleit |
| 9,061,527 B2 † | 6/2015 | Tobin |
| 9,064,165 B2 † | 6/2015 | Havens |
| 9,064,167 B2 † | 6/2015 | Xian |
| 9,064,168 B2 † | 6/2015 | Todeschini |
| 9,064,254 B2 † | 6/2015 | Todeschini |
| 9,066,032 B2 † | 6/2015 | Wang |
| 9,070,032 B2 † | 6/2015 | Corcoran |
| D734,339 S † | 7/2015 | Zhou |
| D734,751 S † | 7/2015 | Oberpriller |
| 9,076,459 B2 † | 7/2015 | Braho |
| 9,079,423 B2 † | 7/2015 | Bouverie |
| 9,080,856 B2 † | 7/2015 | Laffargue |
| 9,082,023 B2 † | 7/2015 | Feng |
| 9,082,031 B2 | 7/2015 | Liu et al. |
| 9,084,032 B2 † | 7/2015 | Rautiola |
| 9,087,250 B2 † | 7/2015 | Coyle |
| 9,092,681 B2 † | 7/2015 | Havens |
| 9,092,682 B2 † | 7/2015 | Wilz, Sr. |
| 9,092,683 B2 † | 7/2015 | Koziol |
| 9,093,141 B2 † | 7/2015 | Liu |
| D737,321 S ‡ | 8/2015 | Lee ................ D14/49 |
| 9,098,763 B2 † | 8/2015 | Lu |
| 9,104,929 B2 † | 8/2015 | Todeschini |
| 9,104,934 B2 † | 8/2015 | Li |
| 9,107,484 B2 † | 8/2015 | Chaney |
| 9,111,159 B2 † | 8/2015 | Liu |
| 9,111,166 B2 † | 8/2015 | Cunningham, IV |
| 9,135,483 B2 † | 9/2015 | Liu |
| 9,137,009 B1 † | 9/2015 | Gardiner |
| 9,141,839 B2 † | 9/2015 | Xian |
| 9,147,096 B2 † | 9/2015 | Wang |
| 9,148,474 B2 † | 9/2015 | Skvoretz |
| 9,158,000 B2 † | 10/2015 | Sauerwein, Jr. |
| 9,158,340 B2 † | 10/2015 | Reed |
| 9,158,953 B2 † | 10/2015 | Gillet |
| 9,159,059 B2 † | 10/2015 | Daddabbo |
| 9,165,174 B2 † | 10/2015 | Huck |
| 9,171,543 B2 † | 10/2015 | Emerick |
| 9,183,425 B2 † | 11/2015 | Wang |
| 9,189,669 B2 † | 11/2015 | Zhu |
| 9,195,844 B2 † | 11/2015 | Todeschini |
| 9,202,458 B2 † | 12/2015 | Braho |
| 9,208,366 B2 † | 12/2015 | Liu |
| 9,208,367 B2 † | 12/2015 | Smith |
| 9,219,836 B2 † | 12/2015 | Bouverie |
| 9,224,022 B2 † | 12/2015 | Ackley |
| 9,224,024 B2 † | 12/2015 | Bremer |
| 9,224,027 B2 † | 12/2015 | Van Horn |
| D747,321 S † | 1/2016 | London |
| 9,230,140 B1 † | 1/2016 | Ackley |
| 9,235,553 B2 † | 1/2016 | Fitch |
| 9,239,950 B2 † | 1/2016 | Fletcher |
| 9,245,492 B2 † | 1/2016 | Ackley |
| 9,248,640 B2 † | 2/2016 | Heng |
| 9,250,652 B2 † | 2/2016 | London |
| 9,250,712 B1 † | 2/2016 | Todeschini |
| 9,251,411 B2 † | 2/2016 | Todeschini |
| 9,258,033 B2 † | 2/2016 | Showering |
| 9,262,633 B1 † | 2/2016 | Todeschini |
| 9,262,660 B2 † | 2/2016 | Lu |
| 9,262,662 B2 † | 2/2016 | Chen |
| 9,269,036 B2 † | 2/2016 | Bremer |
| 9,270,782 B2 † | 2/2016 | Hala |
| 9,274,812 B2 † | 3/2016 | Doren |
| 9,275,388 B2 † | 3/2016 | Havens |
| 9,277,069 B2 † | 3/2016 | Shigenobu |
| 9,277,668 B2 † | 3/2016 | Feng |
| 9,280,693 B2 † | 3/2016 | Feng |
| 9,286,496 B2 † | 3/2016 | Smith |
| 9,297,900 B2 † | 3/2016 | Jiang |
| 9,298,964 B2 † | 3/2016 | Li |
| 9,301,427 B2 † | 3/2016 | Feng |
| D754,205 S ‡ | 4/2016 | Nguyen ................ D14/49 |
| D754,206 S ‡ | 4/2016 | Nguyen ................ D14/49 |
| 9,304,376 B2 † | 4/2016 | Anderson |
| 9,310,609 B2 † | 4/2016 | Rueblinger |
| 9,313,377 B2 † | 4/2016 | Todeschini |
| 9,317,037 B2 † | 4/2016 | Byford |
| 9,319,548 B2 ‡ | 4/2016 | Showering ......... G06K 9/3233 |
| D757,009 S † | 5/2016 | Oberpriller |
| 9,342,723 B2 † | 5/2016 | Liu |
| 9,342,724 B2 † | 5/2016 | McCloskey |
| 9,360,304 B2 † | 6/2016 | Xue |
| 9,361,882 B2 † | 6/2016 | Ressler |
| 9,365,381 B2 † | 6/2016 | Colonel |
| 9,373,018 B2 † | 6/2016 | Colavito |
| 9,375,945 B1 † | 6/2016 | Bowles |
| 9,378,403 B2 † | 6/2016 | Wang |
| D760,719 S † | 7/2016 | Zhou |
| 9,383,848 B2 † | 7/2016 | Daghigh |
| 9,384,374 B2 † | 7/2016 | Bianconi |
| 9,390,304 B2 ‡ | 7/2016 | Chang ................ G06K 7/10821 |
| 9,390,596 B1 † | 7/2016 | Todeschini |
| D762,604 S † | 8/2016 | Fitch |
| 9,411,386 B2 † | 8/2016 | Sauerwein, Jr. |
| 9,412,242 B2 † | 8/2016 | Van Horn |
| 9,418,269 B2 † | 8/2016 | Havens |

(56) References Cited

U.S. PATENT DOCUMENTS

| | | | |
|---|---|---|---|
| 9,418,270 B2 † | 8/2016 | Van Volkinburg | |
| 9,423,318 B2 † | 8/2016 | Liu | |
| 9,424,454 B2 | 8/2016 | Tao et al. | |
| 9,424,461 B1 † | 8/2016 | Yuan | |
| D766,244 S † | 9/2016 | Zhou | |
| 9,436,860 B2 | 9/2016 | Smith et al. | |
| 9,443,123 B2 † | 9/2016 | Hejl | |
| 9,443,222 B2 † | 9/2016 | Singel | |
| 9,454,689 B2 † | 9/2016 | McCloskey | |
| 9,459,913 B2 * | 10/2016 | Manjunath | G06F 9/4843 |
| 9,464,885 B2 † | 10/2016 | Lloyd | |
| 9,465,967 B2 † | 10/2016 | Xian | |
| 9,478,113 B2 † | 10/2016 | Xie | |
| 9,478,983 B2 † | 10/2016 | Kather | |
| D771,631 S † | 11/2016 | Fitch | |
| 9,481,186 B2 † | 11/2016 | Bouverie | |
| 9,487,113 B2 ‡ | 11/2016 | Schukalski | B60N 2/919 |
| 9,488,986 B1 † | 11/2016 | Solanki | |
| 9,489,782 B2 † | 11/2016 | Payne | |
| 9,490,540 B1 † | 11/2016 | Davies | |
| 9,491,729 B2 † | 11/2016 | Rautiola | |
| 9,497,092 B2 † | 11/2016 | Gomez | |
| 9,507,974 B1 † | 11/2016 | Todeschini | |
| 9,519,814 B2 † | 12/2016 | Cudzilo | |
| 9,521,331 B2 † | 12/2016 | Bessettes | |
| 9,530,038 B2 † | 12/2016 | Xian | |
| D777,166 S † | 1/2017 | Bidwell | |
| 9,558,386 B2 † | 1/2017 | Yeakley | |
| 9,572,901 B2 † | 2/2017 | Todeschini | |
| 9,606,581 B1 † | 3/2017 | Howe | |
| D783,601 S † | 4/2017 | Schulte | |
| D785,617 S † | 5/2017 | Bidwell | |
| D785,636 S † | 5/2017 | Oberpriller | |
| 9,646,189 B2 † | 5/2017 | Lu | |
| 9,646,191 B2 † | 5/2017 | Unemyr | |
| 9,652,648 B2 † | 5/2017 | Ackley | |
| 9,652,653 B2 † | 5/2017 | Todeschini | |
| 9,656,487 B2 † | 5/2017 | Ho | |
| 9,659,198 B2 † | 5/2017 | Giordano | |
| D790,505 S † | 6/2017 | Vargo | |
| D790,546 S † | 6/2017 | Zhou | |
| 9,680,282 B2 † | 6/2017 | Hanenburg | |
| 9,697,401 B2 † | 7/2017 | Feng | |
| 9,701,140 B1 † | 7/2017 | Alaganchetty | |
| 2003/0004946 A1 † | 1/2003 | VanDenAvond | |
| 2005/0077361 A1 † | 4/2005 | Sakai | |
| 2007/0063048 A1 † | 3/2007 | Havens | |
| 2008/0185432 A1 | 8/2008 | Caballero et al. | |
| 2009/0134221 A1 † | 5/2009 | Zhu | |
| 2010/0177076 A1 † | 7/2010 | Essinger | |
| 2010/0177080 A1 † | 7/2010 | Essinger | |
| 2010/0177707 A1 † | 7/2010 | Essinger | |
| 2010/0177749 A1 † | 7/2010 | Essinger | |
| 2010/0265880 A1 | 10/2010 | Rautiola et al. | |
| 2011/0169999 A1 † | 7/2011 | Grunow | |
| 2011/0202554 A1 † | 8/2011 | Powilleit | |
| 2012/0111946 A1 † | 5/2012 | Golant | |
| 2012/0137314 A1 * | 5/2012 | Gribel | G06F 9/445 719/328 |
| 2012/0168511 A1 | 7/2012 | Kotlarsky et al. | |
| 2012/0168512 A1 † | 7/2012 | Kotlarsky | |
| 2012/0193423 A1 † | 8/2012 | Samek | |
| 2012/0194692 A1 † | 8/2012 | Mers | |
| 2012/0203647 A1 † | 8/2012 | Smith | |
| 2012/0223141 A1 † | 9/2012 | Good | |
| 2012/0228382 A1 | 9/2012 | Havens et al. | |
| 2012/0248188 A1 | 10/2012 | Kearney | |
| 2013/0043312 A1 † | 2/2013 | Van Horn | |
| 2013/0056542 A1 † | 3/2013 | Gnutzmann | |
| 2013/0075168 A1 † | 3/2013 | Amundsen | |
| 2013/0082104 A1 | 4/2013 | Kearney et al. | |
| 2013/0175341 A1 † | 7/2013 | Kearney | |
| 2013/0175343 A1 † | 7/2013 | Good | |
| 2013/0208131 A1 † | 8/2013 | Grewal | |
| 2013/0257744 A1 † | 10/2013 | Daghigh | |
| 2013/0257759 A1 † | 10/2013 | Daghigh |
| 2013/0270346 A1 † | 10/2013 | Xian |
| 2013/0292475 A1 † | 11/2013 | Kotlarsky |
| 2013/0292477 A1 † | 11/2013 | Hennick |
| 2013/0293539 A1 † | 11/2013 | Hunt |
| 2013/0293540 A1 † | 11/2013 | Laffargue |
| 2013/0306728 A1 † | 11/2013 | Thuries |
| 2013/0306731 A1 † | 11/2013 | Pedrao |
| 2013/0307964 A1 † | 11/2013 | Bremer |
| 2013/0308625 A1 † | 11/2013 | Park |
| 2013/0313324 A1 † | 11/2013 | Koziol |
| 2013/0332524 A1 † | 12/2013 | Fiala |
| 2013/0332996 A1 † | 12/2013 | Fiala |
| 2014/0001267 A1 † | 1/2014 | Giordano |
| 2014/0002828 A1 † | 1/2014 | Laffargue |
| 2014/0022568 A1 † | 1/2014 | Nakaya |
| 2014/0025584 A1 † | 1/2014 | Liu |
| 2014/0034734 A1 † | 2/2014 | Sauerwein, Jr. |
| 2014/0036848 A1 † | 2/2014 | Pease |
| 2014/0039693 A1 † | 2/2014 | Havens |
| 2014/0049120 A1 † | 2/2014 | Kohtz |
| 2014/0049635 A1 † | 2/2014 | Laffargue |
| 2014/0061306 A1 † | 3/2014 | Wu |
| 2014/0063289 A1 † | 3/2014 | Hussey |
| 2014/0066136 A1 † | 3/2014 | Sauerwein |
| 2014/0067692 A1 † | 3/2014 | Ye |
| 2014/0070005 A1 † | 3/2014 | Nahill |
| 2014/0071840 A1 † | 3/2014 | Venancio |
| 2014/0074746 A1 † | 3/2014 | Wang |
| 2014/0076974 A1 † | 3/2014 | Havens |
| 2014/0078342 A1 † | 3/2014 | Li |
| 2014/0097249 A1 | 4/2014 | Gomez et al. |
| 2014/0098792 A1 † | 4/2014 | Wang |
| 2014/0100774 A1 † | 4/2014 | Showering |
| 2014/0100813 A1 † | 4/2014 | Showering |
| 2014/0103115 A1 † | 4/2014 | Meier |
| 2014/0104413 A1 † | 4/2014 | McCloskey |
| 2014/0104414 A1 † | 4/2014 | McCloskey et al. |
| 2014/0104416 A1 † | 4/2014 | Giordano |
| 2014/0106725 A1 † | 4/2014 | Sauerwein, Jr. |
| 2014/0108010 A1 † | 4/2014 | Maltseff |
| 2014/0108402 A1 † | 4/2014 | Gomez |
| 2014/0108682 A1 † | 4/2014 | Caballero |
| 2014/0110485 A1 † | 4/2014 | Toa |
| 2014/0114530 A1 † | 4/2014 | Fitch |
| 2014/0125853 A1 † | 5/2014 | Wang |
| 2014/0125999 A1 † | 5/2014 | Longacre, Jr. |
| 2014/0129378 A1 † | 5/2014 | Richardson |
| 2014/0131443 A1 † | 5/2014 | Smith |
| 2014/0131444 A1 † | 5/2014 | Wang |
| 2014/0133379 A1 † | 5/2014 | Wang |
| 2014/0136208 A1 † | 5/2014 | Maltseff |
| 2014/0140585 A1 † | 5/2014 | Wang |
| 2014/0152882 A1 † | 6/2014 | Samek |
| 2014/0158770 A1 † | 6/2014 | Sevier |
| 2014/0159869 A1 † | 6/2014 | Zumsteg |
| 2014/0166755 A1 † | 6/2014 | Liu |
| 2014/0166757 A1 † | 6/2014 | Smith |
| 2014/0166759 A1 † | 6/2014 | Liu |
| 2014/0168787 A1 † | 6/2014 | Wang |
| 2014/0175165 A1 † | 6/2014 | Havens |
| 2014/0191684 A1 † | 7/2014 | Valois |
| 2014/0191913 A1 † | 7/2014 | Ge |
| 2014/0197239 A1 † | 7/2014 | Havens et al. |
| 2014/0197304 A1 † | 7/2014 | Feng |
| 2014/0204268 A1 † | 7/2014 | Grunow |
| 2014/0214631 A1 † | 7/2014 | Hansen |
| 2014/0217166 A1 † | 8/2014 | Berthiaume |
| 2014/0217180 A1 † | 8/2014 | Liu |
| 2014/0231500 A1 † | 8/2014 | Ehrhart |
| 2014/0247315 A1 † | 9/2014 | Marty |
| 2014/0263493 A1 † | 9/2014 | Amurgis |
| 2014/0263645 A1 † | 9/2014 | Smith |
| 2014/0270196 A1 † | 9/2014 | Braho |
| 2014/0270229 A1 † | 9/2014 | Braho |
| 2014/0278387 A1 † | 9/2014 | DiGregorio |
| 2014/0282210 A1 † | 9/2014 | Bianconi |
| 2014/0288933 A1 † | 9/2014 | Braho |
| 2014/0297058 A1 † | 10/2014 | Barker |

(56) References Cited

U.S. PATENT DOCUMENTS

| | | | |
|---|---|---|---|
| 2014/0299665 | A1† | 10/2014 | Barber |
| 2014/0332590 | A1† | 11/2014 | Wang |
| 2014/0351317 | A1† | 11/2014 | Smith |
| 2014/0362184 | A1† | 12/2014 | Jovanovski |
| 2014/0363015 | A1† | 12/2014 | Braho |
| 2014/0369511 | A1† | 12/2014 | Sheerin |
| 2014/0374483 | A1† | 12/2014 | Lu |
| 2014/0374485 | A1† | 12/2014 | Xian |
| 2015/0001301 | A1† | 1/2015 | Ouyang |
| 2015/0001304 | A1 | 1/2015 | Todeschini |
| 2015/0009338 | A1† | 1/2015 | Laffargue |
| 2015/0014416 | A1† | 1/2015 | Kotlarsky |
| 2015/0021397 | A1† | 1/2015 | Rueblinger |
| 2015/0028104 | A1† | 1/2015 | Ma |
| 2015/0029002 | A1† | 1/2015 | Yeakley |
| 2015/0032709 | A1† | 1/2015 | Maloy |
| 2015/0039309 | A1† | 2/2015 | Braho |
| 2015/0039878 | A1 | 2/2015 | Barten |
| 2015/0040378 | A1† | 2/2015 | Saber |
| 2015/0049347 | A1† | 2/2015 | Laffargue |
| 2015/0051992 | A1† | 2/2015 | Smith |
| 2015/0053769 | A1† | 2/2015 | Thuries |
| 2015/0062366 | A1† | 3/2015 | Liu |
| 2015/0063215 | A1† | 3/2015 | Wang |
| 2015/0088522 | A1† | 3/2015 | Hendrickson |
| 2015/0096872 | A1† | 4/2015 | Woodburn |
| 2015/0100196 | A1† | 4/2015 | Hollifield |
| 2015/0102109 | A1 | 4/2015 | Huck |
| 2015/0115035 | A1† | 4/2015 | Meier |
| 2015/0127791 | A1† | 5/2015 | Kosecki |
| 2015/0128116 | A1† | 5/2015 | Chen |
| 2015/0133047 | A1† | 5/2015 | Smith et al. |
| 2015/0134470 | A1† | 5/2015 | Hejl |
| 2015/0136851 | A1† | 5/2015 | Harding |
| 2015/0142492 | A1† | 5/2015 | Kumar |
| 2015/0144692 | A1† | 5/2015 | Hejl |
| 2015/0144698 | A1† | 5/2015 | Teng |
| 2015/0145916 | A1† | 5/2015 | Ando |
| 2015/0149946 | A1† | 5/2015 | Benos |
| 2015/0161429 | A1† | 6/2015 | Xian |
| 2015/0178523 | A1† | 6/2015 | Gelay |
| 2015/0178537 | A1† | 6/2015 | El Akel |
| 2015/0178685 | A1† | 6/2015 | Krumel |
| 2015/0181109 | A1† | 6/2015 | Gillet |
| 2015/0186703 | A1† | 7/2015 | Chen |
| 2015/0199957 | A1† | 7/2015 | Funyak |
| 2015/0210199 | A1† | 7/2015 | Payne |
| 2015/0212565 | A1† | 7/2015 | Murawski |
| 2015/0213647 | A1† | 7/2015 | Laffargue |
| 2015/0220753 | A1† | 8/2015 | Zhu |
| 2015/0220901 | A1† | 8/2015 | Gomez |
| 2015/0227189 | A1† | 8/2015 | Davis |
| 2015/0236984 | A1† | 8/2015 | Sevier |
| 2015/0239348 | A1‡ | 8/2015 | Chamberlin ............ B60K 35/00 701/36 |
| 2015/0242658 | A1‡ | 8/2015 | Nahill ................. G06K 7/1096 235/43 |
| 2015/0248572 | A1‡ | 9/2015 | Soule, III ................ G06F 16/13 235/43 |
| 2015/0254485 | A1† | 9/2015 | Feng |
| 2015/0261643 | A1‡ | 9/2015 | Caballero ........... G06F 11/0742 235/44 |
| 2015/0264624 | A1‡ | 9/2015 | Wang ....................... G06K 7/01 455/50 |
| 2015/0268971 | A1‡ | 9/2015 | Barten ............. G06K 7/10881 235/46 |
| 2015/0269402 | A1‡ | 9/2015 | Barber ................... H04N 5/343 235/46 |
| 2015/0288689 | A1‡ | 10/2015 | Todeschini .............. H04L 63/06 713/17 |
| 2015/0288896 | A1‡ | 10/2015 | Wang ................... H04N 5/3532 348/29 |
| 2015/0310243 | A1† | 10/2015 | Ackley |
| 2015/0310244 | A1‡ | 10/2015 | Xian ...................... G06K 7/146 235/47 |
| 2015/0310389 | A1† | 10/2015 | Crimm |
| 2015/0312780 | A1‡ | 10/2015 | Wang .................... H04W 24/02 370/32 |
| 2015/0327012 | A1† | 11/2015 | Bian |
| 2015/0363625 | A1† | 12/2015 | Wu |
| 2016/0014251 | A1† | 1/2016 | Hejl |
| 2016/0025697 | A1‡ | 1/2016 | Alt ..................... G01N 33/0098 800/30 |
| 2016/0026838 | A1‡ | 1/2016 | Gillet ................. G06K 7/10831 235/46 |
| 2016/0026839 | A1‡ | 1/2016 | Qu ...................... G06F 9/45558 235/46 |
| 2016/0040982 | A1† | 2/2016 | Li |
| 2016/0042241 | A1† | 2/2016 | Todeschini |
| 2016/0057230 | A1† | 2/2016 | Todeschini |
| 2016/0062473 | A1† | 3/2016 | Bouchat |
| 2016/0070944 | A1 | 3/2016 | McCloskey et al. |
| 2016/0092805 | A1† | 3/2016 | Geisler |
| 2016/0098238 | A1† | 4/2016 | Grandil |
| 2016/0101936 | A1† | 4/2016 | Chamberlin |
| 2016/0102975 | A1† | 4/2016 | McCloskey |
| 2016/0104019 | A1† | 4/2016 | Todeschini |
| 2016/0104274 | A1† | 4/2016 | Jovanovski |
| 2016/0109219 | A1† | 4/2016 | Ackley |
| 2016/0109220 | A1† | 4/2016 | Laffargue |
| 2016/0109224 | A1† | 4/2016 | Thuries |
| 2016/0112631 | A1† | 4/2016 | Ackley |
| 2016/0112643 | A1† | 4/2016 | Laffargue |
| 2016/0117627 | A1† | 4/2016 | Raj |
| 2016/0124516 | A1† | 5/2016 | Schoon |
| 2016/0125217 | A1† | 5/2016 | Todeschini |
| 2016/0125342 | A1† | 5/2016 | Miller |
| 2016/0125873 | A1† | 5/2016 | Braho |
| 2016/0133253 | A1† | 5/2016 | Braho |
| 2016/0163098 | A1† | 6/2016 | Blanchflower |
| 2016/0171597 | A1† | 6/2016 | Todeschini |
| 2016/0171666 | A1† | 6/2016 | McCloskey |
| 2016/0171720 | A1† | 6/2016 | Todeschini |
| 2016/0171775 | A1† | 6/2016 | Todeschini |
| 2016/0171777 | A1† | 6/2016 | Todeschini |
| 2016/0174674 | A1† | 6/2016 | Oberpriller |
| 2016/0178479 | A1† | 6/2016 | Goldsmith |
| 2016/0178685 | A1† | 6/2016 | Young |
| 2016/0178707 | A1† | 6/2016 | Young et al. |
| 2016/0179132 | A1† | 6/2016 | Harr |
| 2016/0179143 | A1† | 6/2016 | Bidwell |
| 2016/0179368 | A1† | 6/2016 | Roeder |
| 2016/0179378 | A1† | 6/2016 | Kent |
| 2016/0180130 | A1† | 6/2016 | Bremer |
| 2016/0180133 | A1‡ | 6/2016 | Oberpriller |
| 2016/0180136 | A1† | 6/2016 | Meier |
| 2016/0180594 | A1† | 6/2016 | Todeschini |
| 2016/0180663 | A1† | 6/2016 | McMahan |
| 2016/0180678 | A1† | 6/2016 | Ackley |
| 2016/0180713 | A1† | 6/2016 | Bernhardt |
| 2016/0185136 | A1† | 6/2016 | Ng |
| 2016/0185291 | A1† | 6/2016 | Chamberlin |
| 2016/0186926 | A1† | 6/2016 | Oberpriller |
| 2016/0188861 | A1† | 6/2016 | Todeschini |
| 2016/0188939 | A1† | 6/2016 | Sailors |
| 2016/0188940 | A1† | 6/2016 | Lu |
| 2016/0188941 | A1† | 6/2016 | Todeschini |
| 2016/0188942 | A1† | 6/2016 | Good |
| 2016/0188943 | A1† | 6/2016 | Franz |
| 2016/0188944 | A1† | 6/2016 | Wilz, Sr. |
| 2016/0189076 | A1† | 6/2016 | Mellott |
| 2016/0189087 | A1† | 6/2016 | Morton |
| 2016/0189088 | A1† | 6/2016 | Pecorari |
| 2016/0189092 | A1† | 6/2016 | George |
| 2016/0189284 | A1† | 6/2016 | Mellott |
| 2016/0189288 | A1† | 6/2016 | Todeschini |
| 2016/0189366 | A1† | 6/2016 | Chamberlin |
| 2016/0189443 | A1† | 6/2016 | Smith |
| 2016/0189447 | A1† | 6/2016 | Valenzuela |
| 2016/0189489 | A1† | 6/2016 | Au |
| 2016/0191684 | A1† | 6/2016 | DiPiazza |
| 2016/0192051 | A1† | 6/2016 | DiPiazza |

(56) References Cited

U.S. PATENT DOCUMENTS

| | | | |
|---|---|---|---|
| 2016/0202951 A1† | 7/2016 | Pike |
| 2016/0202958 A1† | 7/2016 | Zabel |
| 2016/0202959 A1† | 7/2016 | Doubleday |
| 2016/0203021 A1† | 7/2016 | Pike |
| 2016/0203429 A1† | 7/2016 | Mellott |
| 2016/0203797 A1† | 7/2016 | Pike |
| 2016/0203820 A1† | 7/2016 | Zabel |
| 2016/0204623 A1† | 7/2016 | Haggerty |
| 2016/0204636 A1† | 7/2016 | Allen |
| 2016/0204638 A1† | 7/2016 | Miraglia |
| 2016/0227912 A1† | 8/2016 | Oberpriller |
| 2016/0232891 A1† | 8/2016 | Pecorari |
| 2016/0292477 A1† | 10/2016 | Bidwell |
| 2016/0294779 A1† | 10/2016 | Yeakley |
| 2016/0306769 A1† | 10/2016 | Kohtz |
| 2016/0314276 A1† | 10/2016 | Wilz, SR. |
| 2016/0314294 A1† | 10/2016 | Kubler |
| 2016/0316190 A1† | 10/2016 | McCloskey |
| 2016/0323310 A1† | 11/2016 | Todeschini |
| 2016/0325677 A1† | 11/2016 | Fitch |
| 2016/0327614 A1† | 11/2016 | Young |
| 2016/0327930 A1† | 11/2016 | Charpentier |
| 2016/0328762 A1† | 11/2016 | Pape |
| 2016/0330218 A1† | 11/2016 | Hussey |
| 2016/0343163 A1† | 11/2016 | Venkatesha |
| 2016/0343176 A1† | 11/2016 | Ackley |
| 2016/0364914 A1† | 12/2016 | Todeschini |
| 2016/0370220 A1† | 12/2016 | Ackley |
| 2016/0372282 A1† | 12/2016 | Bandringa |
| 2016/0373847 A1† | 12/2016 | Vargo |
| 2016/0377414 A1† | 12/2016 | Thuries |
| 2016/0377417 A1† | 12/2016 | Jovanovski |
| 2017/0010141 A1† | 1/2017 | Ackley |
| 2017/0010328 A1† | 1/2017 | Mullen |
| 2017/0010780 A1† | 1/2017 | Waldron, Jr. |
| 2017/0016714 A1† | 1/2017 | Laffargue |
| 2017/0018094 A1† | 1/2017 | Todeschini |
| 2017/0046603 A1† | 2/2017 | Lee |
| 2017/0047864 A1† | 2/2017 | Stang |
| 2017/0053146 A1† | 2/2017 | Liu et al. |
| 2017/0053147 A1† | 2/2017 | Germaine |
| 2017/0053647 A1† | 2/2017 | Nichols |
| 2017/0055606 A1† | 3/2017 | Xu |
| 2017/0060316 A1† | 3/2017 | Larson |
| 2017/0061961 A1† | 3/2017 | Nichols |
| 2017/0064634 A1† | 3/2017 | Van Horn |
| 2017/0083730 A1† | 3/2017 | Feng |
| 2017/0091502 A1† | 3/2017 | Furlong |
| 2017/0091705 A1† | 3/2017 | Jones |
| 2017/0091706 A1† | 3/2017 | Lloyd |
| 2017/0091741 A1† | 3/2017 | Todeschini |
| 2017/0091904 A1† | 3/2017 | Ventress, Jr. |
| 2017/0092908 A1† | 3/2017 | Chaney |
| 2017/0094238 A1† | 3/2017 | Germaine |
| 2017/0098947 A1† | 4/2017 | Wolski |
| 2017/0100949 A1† | 4/2017 | Celinder |
| 2017/0108838 A1† | 4/2017 | Todeschini |
| 2017/0108895 A1† | 4/2017 | Chamberlin |
| 2017/0118355 A1† | 4/2017 | Wong |
| 2017/0123598 A1† | 5/2017 | Phan |
| 2017/0124369 A1† | 5/2017 | Rueblinger |
| 2017/0124396 A1† | 5/2017 | Todeschini |
| 2017/0124687 A1† | 5/2017 | McCloskey |
| 2017/0126873 A1† | 5/2017 | McGary |
| 2017/0126904 A1† | 5/2017 | d'Armancourt et al. |
| 2017/0139012 A1† | 5/2017 | Smith |
| 2017/0140329 A1† | 5/2017 | Bernhardt |
| 2017/0140731 A1† | 5/2017 | Smith |
| 2017/0147847 A1† | 5/2017 | Berggren |
| 2017/0150124 A1† | 5/2017 | Thuries |
| 2017/0169198 A1† | 6/2017 | Nichols |
| 2017/0171035 A1† | 6/2017 | Lu |
| 2017/0171703 A1† | 6/2017 | Maheswaranathan |
| 2017/0171803 A1† | 6/2017 | Maheswaranathan |
| 2017/0180359 A1† | 6/2017 | Wolski |
| 2017/0180577 A1† | 6/2017 | Nguon |
| 2017/0181299 A1† | 6/2017 | Shi |
| 2017/0190192 A1† | 7/2017 | Delario |
| 2017/0193432 A1† | 7/2017 | Bernhardt |
| 2017/0193461 A1† | 7/2017 | Celinder |
| 2017/0193727 A1† | 7/2017 | Van Horn |
| 2017/0199266 A1‡ | 7/2017 | Rice ..................... G01S 5/0231 |
| 2017/0200108 A1† | 7/2017 | Au |
| 2017/0200275 A1† | 7/2017 | McCloskey |
| 2018/0077300 A1† | 3/2018 | Asai |
| 2018/0307447 A1* | 10/2018 | Tufano .................. G06F 3/1243 |
| 2019/0132402 A1† | 5/2019 | Sato |

FOREIGN PATENT DOCUMENTS

| | | | |
|---|---|---|---|
| WO | 2013/163789 A1 | 11/2013 |
| WO | WO-2013163789 A1 † | 11/2013 |

OTHER PUBLICATIONS

Advisory Action (PTOL-303) dated Oct. 29, 2019 for U.S. Appl. No. 15/839,913.

Applicant Initiated Interview Summary (PTOL-413) dated Sep. 6, 2018 for U.S. Appl. No. 15/839,913.

Brother Industries, Ltd.; "iPrint & Label Application Guide for iOS," Ver.1.1 Dated Apr. 25, 2012; 15 pages [Downloaded from http://www.brother-usa.com/downloads/android-app-label-printing.aspx].

Final Rejection dated Aug. 29, 2019 for U.S. Appl. No. 15/839,913.

Final Rejection dated Nov. 20, 2018 for U.S. Appl. No. 15/839,913.

Hamsoft Uganda Business, "Barcode Generator App", 2 pages [Downloaded from https://play.google.com/store/apps/details?id=hamsoft.inc.barcodegen&hl=en on Dec. 12, 2017].

Non-Final Rejection dated Apr. 24, 2019 for U.S. Appl. No. 15/839,913.

Non-Final Rejection dated May 16, 2018 for U.S. Appl. No. 15/839,913.

Notice of Allowance and Fees Due (PTOL-85) dated Feb. 27, 2020 for U.S. Appl. No. 15/839,913.

Seagull Scientific Inc., "BarTender Brochure" 4 pages, Copyrighted 2016 [Downloaded from https://www.seagullscientific.com/about-us/news/2016/bartender-print-portal-app-delivers-powerful-and-secure-label-printing-from-any-mobile-device/].

U.S. Appl. No. 15/839,913, filed Dec. 13, 2017, U.S. Pat. No. 10,703,112, Patented.

Combined Search and Examination Report in related UK Office Action dated May 16, 2019, pp. 1-7.†

Hamsoft Uganda Business, "Barcode Generator App", 2 pages [Downloaded from https://play.google.com/store/apps/details?id=hamsoft.inc.barcodegen&hl=on Dec. 12, 2017].†

Zebra Technologies; "Print Station for Android; Software note", Downloaded from https://www.zebra.com/content/dam/zebra/manuals/en-us/software/print-station-ug-en.pdf on Feb. 25, 2017; 17 pages.†

\* cited by examiner
† cited by third party
‡ imported from a related application

IMAGE TO SCRIPT CONVERTER

CROSS-REFERENCE TO RELATED APPLICATIONS

This application is a continuation of U.S. application Ser. No. 15/839,913, filed Dec. 13, 2017, the entire contents of which are incorporated herein by reference.

FIELD OF THE INVENTION

The present invention generally relates to printing, and more particularly to improve the efficiency in amending and reproducing a label.

BACKGROUND

Generally speaking, it can be difficult to amend and reproduce a label without access to the actual source script. Customers who wish to print a certain label may have to use a software program to create the label. The user may know what kind of label the user desires, but to create the label, the user would first have to learn a new software program or a new printer language before able to create the label. This task may require a significant amount of time to learn the new program or language. In some cases, the user may only want to change a small portion of an existing label design. If the source code or source file of the original label cannot be found, or difficult to retrieve, the user may have to redesign or re-code every single element of the original label.

Therefore, a need exists for a method/apparatus to quickly and accurately amend and reproduce a label without access to the actual source script.

SUMMARY

Accordingly, in one aspect, the present invention embraces an image to script converter for thermal printers to assist users in reproducing or amending a label without actual source script. A device, for example but not limited to, a mobile device, a smart phone, a smart mobile phone, or a computer, may comprise a software application that may be able to scan the image of a barcode label, or capture by a camera a photograph of the label. The software application may use an image processing library to recognize smart object fields in the captured image, then may translate the smart object information to a printing language script automatically.

In an exemplary embodiment, a method may comprise capturing, by a device, an image of a label; processing, by the device, the image with an image processor; identifying, by the device, smart objects in the captured image, wherein the smart objects include text, barcodes, shapes and smart object images. In response to a user of the device deciding not to configure the smart objects, the device automatically generates a source script file based on smart object information, and in response to the user of the device deciding to configure the identified smart objects, updating, by the user, the smart object information, and then the device automatically generates the source script file based on the updated smart object information; and transferring, by the device, the generated source script file based on the smart object information or the updated smart object information to a printer.

The method may further comprise the following: Updating, by the device the smart object information may include adjusting parameters specific to each of the identified smart objects. The device, which comprises a processor, may utilize one or more applications that reside on the device and/or are web-based applications. The one or more applications may be supported by an iOS software platform and/or an Android software platform that recognize field information of the smart objects, and translates the field information to a printing language script. The iOS software platform and/or the Android software platform may utilize an open source open-CV image processing library to recognize the field information of the smart objects and to translate the field information to printing language script. Printing language script utilized in the generated source script file may be Honeywell Fingerprint language. The printer may reproduce a replica printed image of the label by generating a printing language script.

In another exemplary embodiment, a user may decide whether or not to configure the identified smart objects. In response to the user deciding not to configure the identified smart objects, the device may automatically generate the source script file based on the smart object information. In response to the user deciding to configure the identified smart objects, the device may update the smart object information and then may automatically generate the source script file based on the updated smart object information. In response to the smart objects not being identified in the captured image, the method may be terminated.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces an image to script converter for thermal printers to assist users in reproducing or amending a label without actual source script. A device, for example but not limited to, a mobile device, a smart phone, a smart mobile phone, or a computer, may comprise a software application that may be able to scan the image of a barcode label, or capture by a camera a photograph of the label. The software application may use an image processing library to recognize smart object fields in the captured image, namely text, barcodes, smart object images and shapes and then may translate the smart object information to a printing language script automatically. The application may provide the capability to a user to adjust the parameters specific to each of the identified smart objects and once the user makes the necessary changes, a source script file may be generated based on the updated smart object information. Then, the label may be sent to a printer from the application itself. The application also may store multiple printer languages to accommodate printing to different printers. In other words, with smart object images and shapes the user may make changes to the image and/or shape. The changes may include, but without limitations scaling, re-positioning and/or even replacing with another image/shape. Other embodiments of the present invention may include, but without limitations various types of media and documents.

In other words, embodiments of the present invention may require a device to be capable of capturing an image and associated application software to be capable to process the image. Additionally, the associated application software allows the scanned image or photograph to be automatically translated to a printer language script. Users may change content of the script without having to design the whole script. An example embodiment may be changing a one dimensional bar code to a two dimensional bar code. The present invention may not create a replica of the actual source script, but may create another source script capable of generating a replica printed image. The associated application software may reside on the device or may be one or more web-based application.

With the present invention, a user does not need to learn any printer specific languages to edit or create a label. In an embodiment, the user may simply take a snapshot of an existing label and edit the label in real-time. The images may be converted and saved in a supported printer language script, e.g., for example, but not limited to Honeywell Fingerprint language. In other embodiments, the present invention may be implemented to create source scripts of other languages. Information may be added that allows the user to choose which printing command language that they wish to output. And if the user wants to print the output directly to a connected printer, the software may be able to retrieve information from the connected printer and output the appropriate format so that the printer can print.

The mobile application may be designed, for example, but not limited to, for an iOS/Android software platform, using the open source open-CV image processing library to recognize field information of smart objects, and then translate to a Fingerprint printing language script. (CV is Computer Vision). The user may also be able to edit the smart objects with different parameters before generating the script.

The smart objects may be categorized into 4 different categories, such as barcodes, text, shapes, and smart object images. An image may be a picture, for example, but not limited to, a company logo. The parameters, as specified per the open source open-CV image processing library, may be specific to each of the identified smart object, for example, but not limited to, barcodes including different types of barcodes types such as datamatrix, QR codes, code 39, code 128 and etc. The user may decide to configure the identified smart objects. If the user decides to configure the smart objects, the device proceeds to update smart object information. Whether or not the user decides to configure the identified smart objections, the device automatically generates the source script file.

Figure 1:
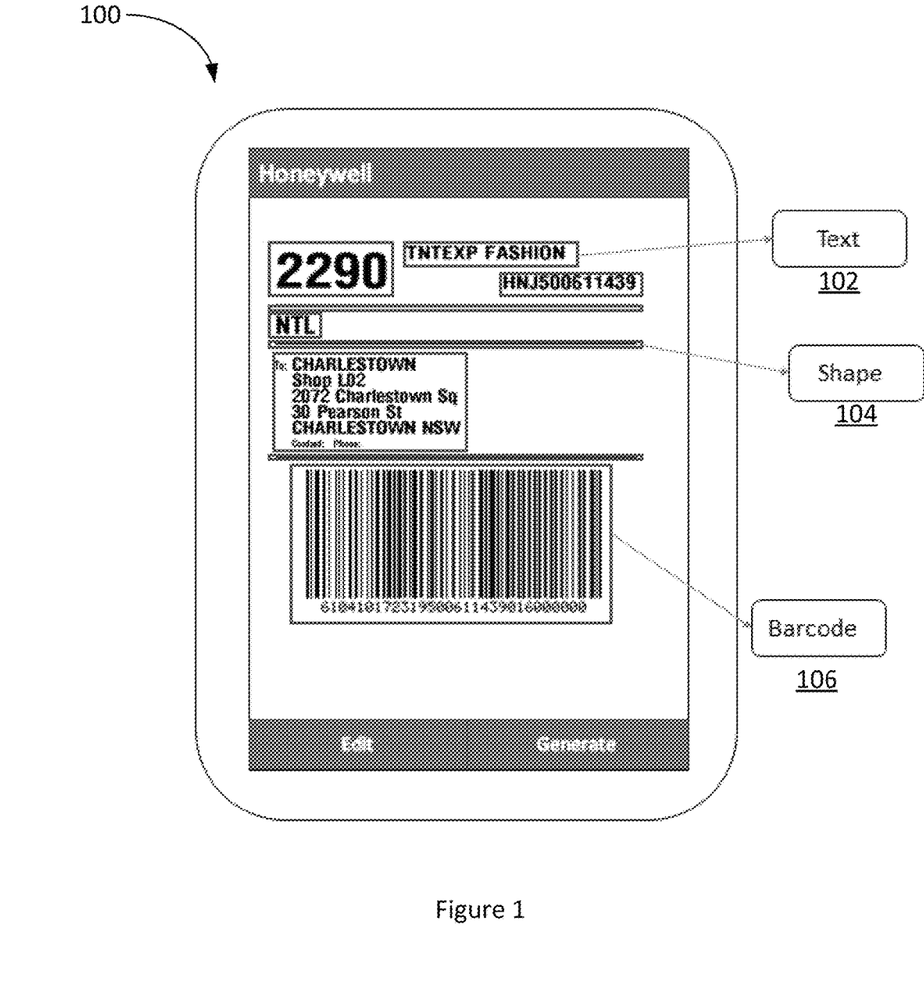
FIG. 1 illustrates an exemplary embodiment of a product label comprising smart objects.

FIG. 1 illustrates exemplary embodiment of label 100 comprising a several smart objects, including text 102, shapes 104, and barcodes 106. Smart objects may refer to the elements that are successfully identified as modifiable elements. For example, a barcode may be identified as an image or a smart-object-barcode. A smart object may be represented by a scripting source language, while an image may only be represented by byte data. If an object has scripting source language, it may have greater options for modifications via changing fields and variables in the scripting source language. An image on the other hand, may have limited options for modifications, etc. height, or width size, rotation.

Figure 2:
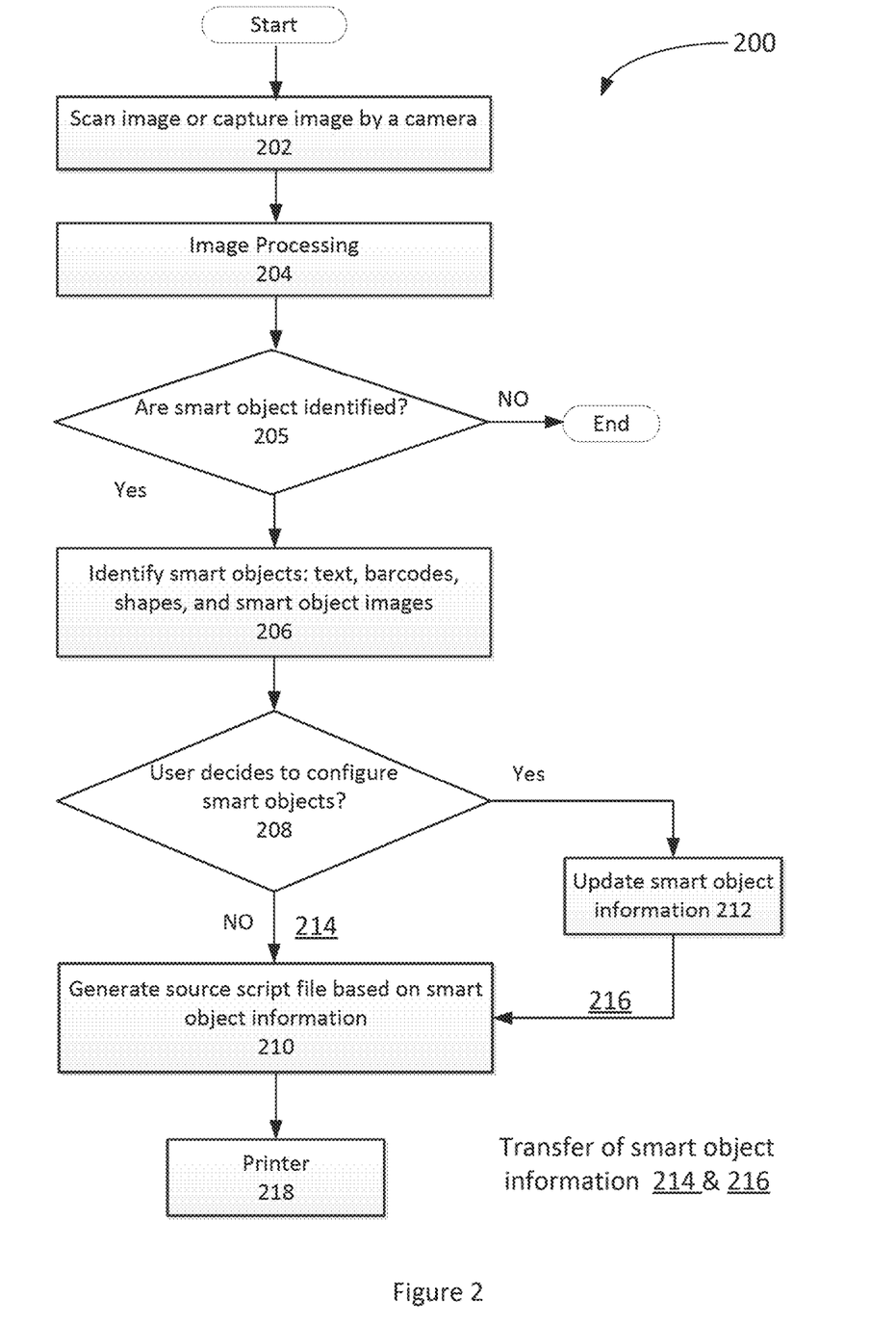
FIG. 2 illustrates an exemplary embodiment of a flowchart for converting an image to source script.

FIG. 2 illustrates exemplary embodiment of flowchart 200 that describes a method to convert an image to source script representing the image.

The method may include a user and a device. The device may be a mobile device or a computer that may utilize an associated application. The associated application may be an application that resides in the device, or may be a web-based application. The device may include a camera or a scanner, and may be operable to capture a photographic image of the item, or may be operable to scan an image of the item, e.g. for a barcode. The scanner may be an office document scanner in which the scanned result is an image. The camera may be associated with a mobile phone. The method comprises the following steps:

Capturing or acquiring a photograph (photo) or image of the label or other item. (step 202) This step may include scanning a barcode of a label or taking a photograph of the label.

Processing the image with an image processor associated with the device, or web-based imaging software. (step 204)

Determining if smart objects can be identified. (step 205). If smart objects cannot be identified, the method terminates.

If smart objects can be identified, identifying the smart objects in the photo/image. The smart objects may include text, barcodes, smart object images, and shapes. (step 206)

The user may decide to configure the smart objects, or not. (step 208)

In response to the user deciding not to configure the identified smart objects, the application may proceed to automatically generate a source script file based on the smart object information. (step 210)

In response to the user deciding to configure the identified smart objects, the application may update the smart object information. This update may include adjusting parameters specific to each of the identified smart objects. (step 212) The application then proceeds to automatically generates a source script file based on the updated smart object information. (step 210)

The generated source script file is transferred to a printer for a print operation. (step 218)

Hence, once the smart object information is available, it may be transferred automatically in step 214 (or step 216) to a script file generator causing each object to be converted to information that will form up the source script file. (step 210)

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;

U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; 8,740,082;
U.S. Pat. Nos. 8,740,085; 8,746,563;
U.S. Pat. Nos. 8,750,445; 8,752,766;
U.S. Pat. Nos. 8,756,059; 8,757,495;
U.S. Pat. Nos. 8,760,563; 8,763,909;
U.S. Pat. Nos. 8,777,108; 8,777,109;
U.S. Pat. Nos. 8,779,898; 8,781,520;
U.S. Pat. Nos. 8,783,573; 8,789,757;
U.S. Pat. Nos. 8,789,758; 8,789,759;
U.S. Pat. Nos. 8,794,520; 8,794,522;
U.S. Pat. Nos. 8,794,525; 8,794,526;
U.S. Pat. Nos. 8,798,367; 8,807,431;
U.S. Pat. Nos. 8,807,432; 8,820,630;
U.S. Pat. Nos. 8,822,848; 8,824,692;
U.S. Pat. Nos. 8,824,696; 8,842,849;
U.S. Pat. Nos. 8,844,822; 8,844,823;
U.S. Pat. Nos. 8,849,019; 8,851,383;
U.S. Pat. Nos. 8,854,633; 8,866,963;
U.S. Pat. Nos. 8,868,421; 8,868,519;
U.S. Pat. Nos. 8,868,802; 8,868,803;
U.S. Pat. Nos. 8,870,074; 8,879,639;
U.S. Pat. Nos. 8,880,426; 8,881,983;
U.S. Pat. Nos. 8,881,987; 8,903,172;
U.S. Pat. Nos. 8,908,995; 8,910,870;
U.S. Pat. Nos. 8,910,875; 8,914,290;
U.S. Pat. Nos. 8,914,788; 8,915,439;
U.S. Pat. Nos. 8,915,444; 8,916,789;
U.S. Pat. Nos. 8,918,250; 8,918,564;
U.S. Pat. Nos. 8,925,818; 8,939,374;
U.S. Pat. Nos. 8,942,480; 8,944,313;
U.S. Pat. Nos. 8,944,327; 8,944,332;
U.S. Pat. Nos. 8,950,678; 8,967,468;
U.S. Pat. Nos. 8,971,346; 8,976,030;
U.S. Pat. Nos. 8,976,368; 8,978,981;
U.S. Pat. Nos. 8,978,983; 8,978,984;
U.S. Pat. Nos. 8,985,456; 8,985,457;
U.S. Pat. Nos. 8,985,459; 8,985,461;
U.S. Pat. Nos. 8,988,578; 8,988,590;
U.S. Pat. Nos. 8,991,704; 8,996,194;
U.S. Pat. Nos. 8,996,384; 9,002,641;
U.S. Pat. Nos. 9,007,368; 9,010,641;
U.S. Pat. Nos. 9,015,513; 9,016,576;
U.S. Pat. Nos. 9,022,288; 9,030,964;
U.S. Pat. Nos. 9,033,240; 9,033,242;
U.S. Pat. Nos. 9,036,054; 9,037,344;
U.S. Pat. Nos. 9,038,911; 9,038,915;
U.S. Pat. Nos. 9,047,098; 9,047,359;
U.S. Pat. Nos. 9,047,420; 9,047,525;
U.S. Pat. Nos. 9,047,531; 9,053,055;
U.S. Pat. Nos. 9,053,378; 9,053,380;
U.S. Pat. Nos. 9,058,526; 9,064,165;
U.S. Pat. Nos. 9,064,165; 9,064,167;
U.S. Pat. Nos. 9,064,168; 9,064,254;
U.S. Pat. Nos. 9,066,032; 9,070,032;
U.S. Pat. Nos. 9,076,459; 9,079,423;
U.S. Pat. Nos. 9,080,856; 9,082,023;
U.S. Pat. Nos. 9,082,031; 9,084,032;
U.S. Pat. Nos. 9,087,250; 9,092,681;
U.S. Pat. Nos. 9,092,682; 9,092,683;
U.S. Pat. Nos. 9,093,141; 9,098,763;
U.S. Pat. Nos. 9,104,929; 9,104,934;
U.S. Pat. Nos. 9,107,484; 9,111,159;
U.S. Pat. Nos. 9,111,166; 9,135,483;
U.S. Pat. Nos. 9,137,009; 9,141,839;
U.S. Pat. Nos. 9,147,096; 9,148,474;
U.S. Pat. Nos. 9,158,000; 9,158,340;
U.S. Pat. Nos. 9,158,953; 9,159,059;
U.S. Pat. Nos. 9,165,174; 9,171,543;
U.S. Pat. Nos. 9,183,425; 9,189,669;
U.S. Pat. Nos. 9,195,844; 9,202,458;
U.S. Pat. Nos. 9,208,366; 9,208,367;
U.S. Pat. Nos. 9,219,836; 9,224,024;
U.S. Pat. Nos. 9,224,027; 9,230,140;
U.S. Pat. Nos. 9,235,553; 9,239,950;
U.S. Pat. Nos. 9,245,492; 9,248,640;
U.S. Pat. Nos. 9,250,652; 9,250,712;
U.S. Pat. Nos. 9,251,411; 9,258,033;
U.S. Pat. Nos. 9,262,633; 9,262,660;
U.S. Pat. Nos. 9,262,662; 9,269,036;
U.S. Pat. Nos. 9,270,782; 9,274,812;
U.S. Pat. Nos. 9,275,388; 9,277,668;
U.S. Pat. Nos. 9,280,693; 9,286,496;
U.S. Pat. Nos. 9,298,964; 9,301,427;
U.S. Pat. Nos. 9,313,377; 9,317,037;
U.S. Pat. Nos. 9,319,548; 9,342,723;
U.S. Pat. Nos. 9,361,882; 9,365,381;
U.S. Pat. Nos. 9,373,018; 9,375,945;
U.S. Pat. Nos. 9,378,403; 9,383,848;
U.S. Pat. Nos. 9,384,374; 9,390,304;
U.S. Pat. Nos. 9,390,596; 9,411,386;
U.S. Pat. Nos. 9,412,242; 9,418,269;
U.S. Pat. Nos. 9,418,270; 9,465,967;
U.S. Pat. Nos. 9,423,318; 9,424,454;
U.S. Pat. Nos. 9,436,860; 9,443,123;
U.S. Pat. Nos. 9,443,222; 9,454,689;
U.S. Pat. Nos. 9,464,885; 9,465,967;
U.S. Pat. Nos. 9,478,983; 9,481,186;
U.S. Pat. Nos. 9,487,113; 9,488,986;
U.S. Pat. Nos. 9,489,782; 9,490,540;
U.S. Pat. Nos. 9,491,729; 9,497,092;
U.S. Pat. Nos. 9,507,974; 9,519,814;
U.S. Pat. Nos. 9,521,331; 9,530,038;
U.S. Pat. Nos. 9,572,901; 9,558,386;
U.S. Pat. Nos. 9,606,581; 9,646,189;
U.S. Pat. Nos. 9,646,191; 9,652,648;
U.S. Pat. Nos. 9,652,653; 9,656,487;
U.S. Pat. Nos. 9,659,198; 9,680,282;
U.S. Pat. Nos. 9,697,401; 9,701,140;
U.S. Design Pat. No. D702,237;
U.S. Design Pat. No. D716,285;

U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;

U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;

U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method, comprising:
    identifying, by a device, a plurality of smart objects in an image of a label, wherein the label is printed with an original script associated with a first printing command language, and wherein the plurality of smart objects corresponds to individually modifiable elements of the label;
    in response to receiving an input from a user of the device to modify a first smart object in the identified plurality of smart objects, updating the first smart object;
    automatically generating, by the device, a source script file based on the updated first smart object, wherein the source script file is generated in a second printing command language selected by the user; and
    transferring, by the device, the generated source script file to a printer for printing.

2. The method according to claim 1, further comprising capturing, by the device, the image of the label printed with the first printing command language.

3. The method according to claim 1, wherein, the individually modifiable elements comprise at least one of a text, a barcode, a shape and a smart object image.

4. The method according to claim 1, further comprising updating, by the device, the first smart object by adjusting parameter specific to the first smart object.

5. The method according to claim 1, further comprising utilizing an application stored on the device or a web-based application.

6. The method according to claim 5, wherein, the application stores multiple printing command languages to generate source script file to support printing via different printers.

7. The method according to claim 5, wherein, the application is supported by an iOS software platform and/or an Android software platform that recognize field information of the plurality of smart objects and translate the field information to a printing command language script.

8. The method according to claim 7, wherein, the iOS software platform or the Android software platform utilizes an open source open-CV image processing library to recognize the field information of the plurality of smart objects and to translate the field information to the printing command language script.

9. A method, comprising:
    identifying, by a device, a plurality of smart objects in an image of a label, wherein the label is printed with an original script associated with a first printing command language, and wherein the plurality of smart objects corresponds to individually modifiable elements of the label;
    generating, by the device, a source script file based on a modified smart object in the image of the label, wherein the source script file is generated in a second printing command language selected by a user; and
    transferring, by the device, the generated source script file to a printer for printing.

10. The method according to claim 9, further comprising receiving an input from a user to modify a smart object identified in the image of the label.

11. The method according to claim 9, wherein, the individually modifiable elements comprise at least one of a text, a barcode, a shape and a smart object image.

12. The method according to claim 9, further comprising capturing, by the device, the image of the label printed with the first printing command language.

13. The method according to claim 12, wherein the device is a mobile device comprising a scanner and/or a camera.

14. A device comprising:
    a processor configured to:
    identify a plurality of smart objects in an image of a label, wherein the label is printed with an original script associated with a first printing command language, and wherein the plurality of smart objects corresponds to individually modifiable elements of the label;

generate a source script file based on a modified smart object in the image of the label, wherein the source script file is generated in a second printing command language selected by a user; and transfer the generated source script file to a printer for printing.

15. The device according to claim 14, further comprising a capturing unit to capture the image of the label printed with the first printing command language.

16. The device according to claim 15, wherein the capturing unit is a scanner or a camera.

17. The device according to claim 14, wherein the processor is further configured to receive an input from a user to modify a smart object identified in the image of the label.

18. The device according to claim 14, wherein, the individually modifiable elements comprise at least one of a text, a barcode, a shape and a smart object image.

19. The device according to claim 14, further comprising an application supported by an iOS software platform and/or an Android software platform that recognize field information of the plurality of smart objects and translate the field information to a printing command language script.

20. The device according to claim 19, wherein, the iOS software platform or the Android software platform utilizes an open source open-CV image processing library to recognize the field information of the plurality of smart objects and to translate the field information to the printing command language script.

* * * * *